United States Patent [19]

Taylor

[11] 4,274,795
[45] Jun. 23, 1981

[54] LOAD CARRYING VEHICLES

[75] Inventor: Robert A. Taylor, Aylesbury, England

[73] Assignee: Lancer Boss Limited, England

[21] Appl. No.: 932,145

[22] Filed: Aug. 9, 1978

[30] Foreign Application Priority Data

Apr. 5, 1978 [GB] United Kingdom ............... 13332/78

[51] Int. Cl.³ ............................................. B66C 23/80
[52] U.S. Cl. .................................. 414/673; 180/24.02; 212/189; 280/764; 280/767; 414/719
[58] Field of Search ............... 414/673, 917, 719, 674; 280/763–767, 639, 43.17; 212/145, 189; 180/24.02

[56] References Cited

U.S. PATENT DOCUMENTS

| Re. 24,895 | 11/1960 | Clements | 280/639 |
| Re. 25,617 | 7/1964 | Lyall | 180/24.02 X |
| 3,441,102 | 4/1969 | Kress | 180/24.02 |
| 3,717,271 | 2/1973 | Bargman, Jr. | 414/917 X |
| 3,900,119 | 8/1975 | Olsen | 280/767 X |
| 4,068,773 | 1/1978 | Downing et al. | 414/674 X |

FOREIGN PATENT DOCUMENTS

| 1927579 | 12/1969 | Fed. Rep. of Germany | 414/673 |
| 1116981 | 6/1968 | United Kingdom | 280/766 |

Primary Examiner—Stephen G. Kunin
Assistant Examiner—Edmond G. Rishell, Jr.
Attorney, Agent, or Firm—Karl W. Flocks

[57] ABSTRACT

A load-carrying vehicle provided with lifting devices to raise and lower loads, comprising a chassis mounted on road wheels, load raising and lowering devices supported by the chassis, at least one additional road wheel articulated with respect to the chassis, and power operated devices operable to move each additional road wheel in an arcuate path from an inoperative position within the normal width of the vehicle to an operative load bearing position in engagement with the ground beside the road wheels of the vehicle.

4 Claims, 5 Drawing Figures

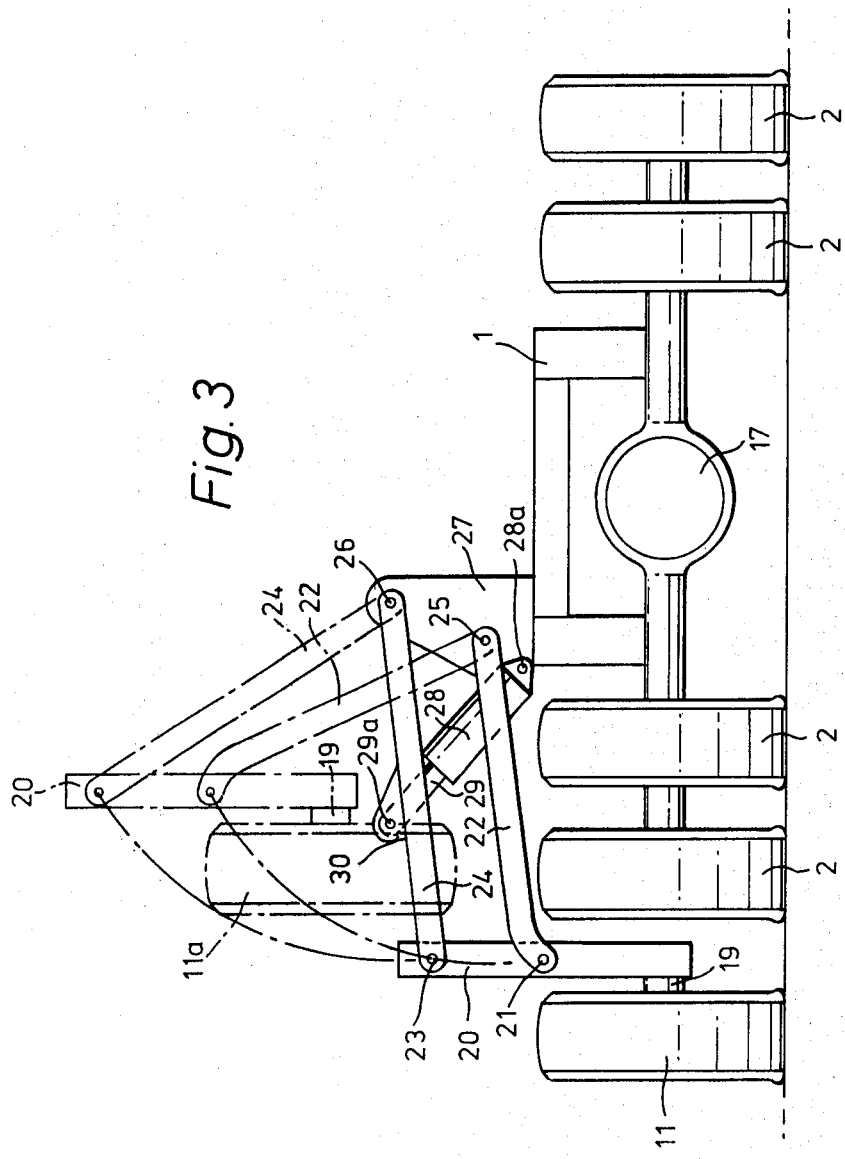

LOAD CARRYING VEHICLES

BACKGROUND OF THE INVENTION

1. Field of the Invention

This invention relates to load-carrying vehicles such as mobile cranes and fork lift trucks which run on ground engaging wheels.

2. Description of Prior Art

It has hitherto been proposed to provide fork lift trucks with additional road wheels movable from an inoperative position clear of the ground or a non load bearing position to an operative position in engagement with the ground outside the front wheels of the vehicle disposed generally beneath or adjacent to the load lifting mast. Such additional wheels moved vertically between the inoperative and operative positions and thus increased the overall width of the truck. Also such wheels were moved up and down by power operated means, such as hydraulic rams, actuated automatically in response to the raised load carried by or being lifted by the mast of the truck, or they may be operated at will by the driver over-riding the automatic means. In one construction the additional wheels were raised and lowered by hydraulic rams in circuit with the ram which raised and lowered the fork carriage riding up and down the mast. In such a system the forces on the front axles of the truck road wheels vary for a given load on the forks.

In many applications fork lift trucks are used in confined spaces such as between stacks of timber or in the holds of ships or through restricted warehouse doorways or enter and travel vertically in lifts from deck to deck. In such cases the conventional trucks are constructed to be passed through the openings, restricted doors and lifts with the minimum of clearance each side. Also where loads to be lifted by the forks are often in somewhat inaccessible places the forks have to engage under the loads on a long load centre so that in the known constructions the additional wheels could prevent the load being reached and lifted due to the extra width resulting from the additional road wheels which is disadvantageous. Moreover the additional wheel interfers with access for servicing and wheel changing of the front road wheels of the truck.

The main object of the present invention is to provide load lifting vehicles such as mobile cranes or fork lift trucks with such additional road wheels in which the aforesaid disadvantages are reduced compared with known constructions.

SUMMARY

According to the present invention a load-carrying vehicle for raising and lowering loads, with an overturning moment about the axis of the vehicle front road wheels caused by supporting of a load, said load-carrying vehicle comprising a chassis mounted on conventional road wheels, load carrying means including load raising and lowering means supported by said chassis, at least one additional road wheel, parallelogram linkage means interconnecting said at least one additional road wheel and said chassis to articulate said at least one additional road wheel for movement with respect to said chassis, whereby in an inoperative position said at least one additional road wheel is supported by said parallelogram linkage means above the front road wheels within the transverse outside spacing thereof, and in an operative load-bearing position said at least one additional road wheel is disposed in engagement with the ground beside the front road wheels of the vehicle, and power operated means connected between said chassis and said parallelogram linkage means and operable in response to an overturning moment about the vehicle front road wheels when a load is supported by said load carrying means to move said at least one additional road wheel between said inoperative and operative positions.

In a preferred construction of the invention applied to a vehicle in which the load is supported by one end portion of a load carrying arm articulated at its other end portion to the vehicle chassis, an hydraulic ram is provided between the chassis and the arm to raise and lower the arm, and the power operated means to move the additional wheel comprises an hydraulic ram in the hydraulic circuit of the first named ram to move the additional wheel in to engagement with the ground when the over turning moment about the axis of the first road wheel axle exceeds a predetermined value.

In another preferred construction applied to a fork lift truck having load carrying forks raisable on a mast tiltable fore and aft about its lower end with respect to the truck chassis by an hydraulic ram or rams, the power operated means to move the additional road wheel comprises an hydraulic ram in the hydraulic circuit of the first named ram or rams to move the additional wheel into engagement with the ground when the overturning moment about the axis of the truck front road wheel axle exceeds a predetermined value.

If desired a manual control operable by the vehicle operator is provided in the control means of the power operated means of the additional road wheel and is operable by the vehicle operator to override actuation of the power operated means is response to the turning moment about the vehicle front road wheel axle.

In order that the invention may be more fully understood some embodiments in accordance therewith will now be described by way of example with reference to the accompanying drawings in which

BRIEF DESCRIPTION OF DRAWINGS

FIG. 3 is a view looking from the front of a load carrying vehicle such as shown in FIG. 1 or FIG. 2, and showing an additional road wheel and its operating mechanism;

In the drawings like references are used to indicate the same or similar parts. In this description the term "chassis" is used to include the actual chassis or the body of a vehicle or truck.

DESCRIPTION OF THE PREFERRED EMBODIMENT

Figure 1:
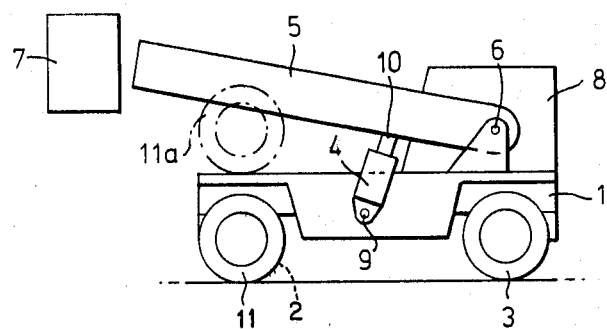
FIG. 1 is a diagrammatic side elevation of one form of load carrying vehicle showing the inoperative and operative positions of the additional wheel.

Referring to FIG. 1 this shows a load carrying vehicle having a chassis 1 mounted on front road wheels 2 and rear wheels 3, a driver's cab 8, and a load carrying cantilever arm 5. The arm 5 is pivoted at 6 to the chassis and has a load carrying device 7 of any suitable form. The arm 5 is raised and lowered by any suitable power operated means, shown by way of example as an hydraulic ram 4 pivoted at 9 to the chassis and at 10 to the arm. The vehicle has an additional road wheel 11 mounted on the chassis as will be described and indicated in dotted lines at 11a to show that it can rise to its inoperative position without fouling any part of the truck including the arm 5.

Figure 2:
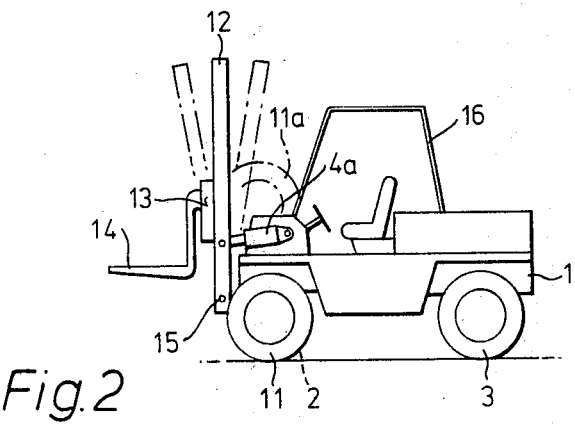
FIG. 2 is an elevation similar to FIG. 1 showing another form of load carrying vehicle.

FIG. 2 shows a similar view of FIG. 1, but with the vehicle in the form of a fork lift truck. The truck has the conventional fork lift mast 12, with its fork carriage 13 and forks 14 movable up and down on the mast by an hydraulic ram (not shown). The mast is pivoted at 15 at its lower end and can be tilted into the fore and aft dotted positions by an hydraulic ram 4a or other power operated means. The position of the raised inoperative additional wheel is shown at 11a.

In both FIGS. 1 and 2 the vehicle is driven from its prime mover (not shown) e.g. a Diesel engine through the front axle 17 to the wheels 2 as seen in FIG. 3 and is steered by its rear wheels 3.

Referring to FIG. 3 this shows the front wheels 2 driven through the axle 17 and mounted on the chassis 1. The additional road wheel 11 is shown at one side of the vehicle, but a similar wheel and mounting may be and preferably is also provided at the opposite side of the vehicle as in FIGS. 1 and 2. As seen more fully in FIG. 4 the wheel 11 is mounted on a stub axle 19 secured to an arm, a rod or a plate 20 pivoted at 21 to a lower link 22 and at 23 to an upper link 24. At their opposite ends the links 22, 24 are pivoted respectively at 25, 26 at their other ends to a bracket 27 fast on the chassis 1. An hydraulic ram is pivoted by its cylinder 28 to the bracket 27 and 28a and the free end of the piston rod 29 is pivoted at 29a to a bracket 30 on the line 24 between the ends of the link.

Figure 4:
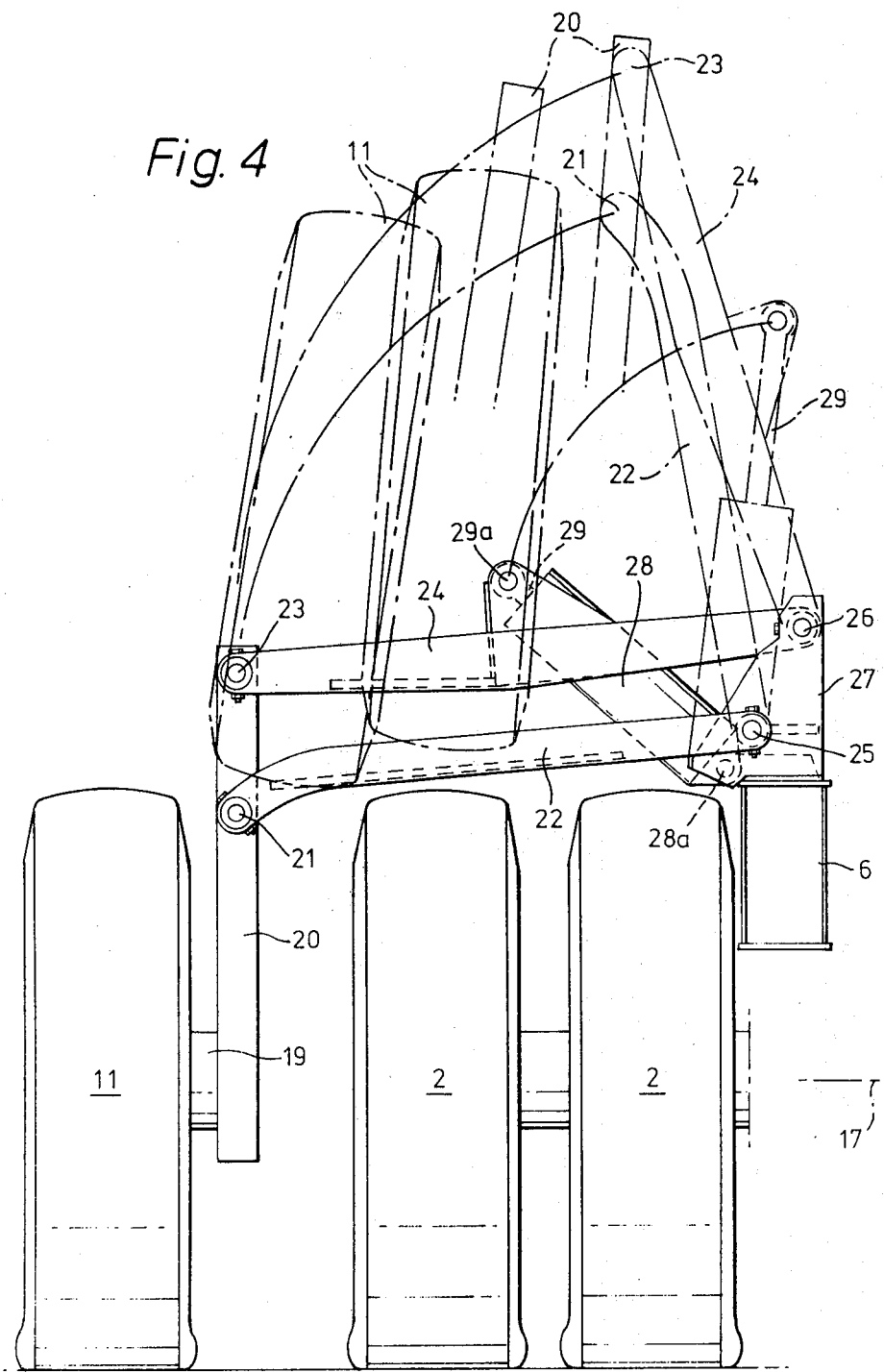
FIG. 4 is a view on a diagrammatically enlarged scale of the additional wheel and operating mechanism of FIG. 3, the wheel and mechanism being shown in full lines on the operative road engaging position, and in dotted lines indicating the wheel and mechanism in two inoperative positions, the uppermost position being when it is fully withdrawn from the operative position.

As seen in FIG. 4 the lower link 22 is curved at its outer end 21 so that it does not foul the wheels 2 and the two links 22, 24 are so arranged as to function as a parallel motion linkage. In FIG. 4 the additional wheel is shown in its operative position engaging the ground thus sharing the load on the front axle of the vehicle.

Figure 5:
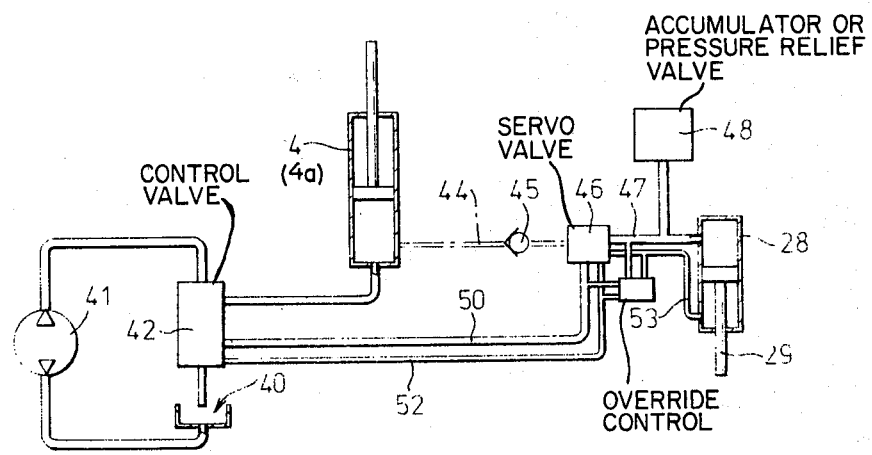
FIG. 5 shows a suitable hydraulic operating circuit for a vehicle having an additional wheel assembly of the invention.

When the additional wheel is to be raised into its inoperative or non load carrying position the piston rod of the ram 28, which is double acting, is caused by operation of the fluid circuit of FIG. 5, to be described, to move out of the cylinder thereby elevating the link 24 about its pivot 26 and causing the link to swing upwardly about its pivot 25, while the arm or plate 20 rises in a clockwise direction, in FIG. 4, thereby lifting the additional wheel 11 and carrying it over the road wheels 2. Thus in its inoperative position the wheel 11 is within the transverse outside spacing of the front road wheels.

It will be understood that the pivots 21, 23, 25, 26 and 28a and 29a may be of any suitable form and may consist of pins journalled in bearings in bores in the rod or plate 20, the brackets 27 and 30 and the cylinder and piston.

While the additional wheel 11 (or wheels) is raised and lowered by the arm as herein described, this movement may be effected by any other power operated means such as pneumatic rams or rack and pinion drives, or it may be electrically operated, or a power operated winch and cable arrangement may be employed.

Referring to FIG. 5 this shows an hydraulic operating circuit for the vehicles shown in FIGS. 1 to 4, the cylinder with numeral 4 designation representing the ram 4 in FIG. 1 and the tilt ram 4a in FIG. 2.

The circuit includes a reservoir 40 for hydraulic fluid and a pump 41, one side of which is connected to the reservoir and the other side of which is connected to a control valve 42. During a lifting operation, fluid passes from the control valve 42 to the lifting ram 4, thus elevating the cantilever arm 5. The ram 4 is connected via a pilot line 44 and one-way valve 45 to a servo valve 46, which is also connected by line 50 to the control valve 42. Alternatively an electric sensor may be connected between the ram 4 and the valve 46 so that changes in ram pressure initiate a signal to adjust the valve 46. The ram 28 for raising and lowering the wheel 11 is connected to the servo valve 46 via line 47, and an accumulator or pressure relief valve 48 is connected to this line 47 between the servo valve 46 and the ram 28.

During a lifting operation, if the pressure in the ram 4 and hence line 44 or electrical sensor signal exceeds a predetermined level resulting from a predetermined load and hence overturning moment carried by the cantilever arm 5, the servo valve 46 is operated, allowing fluid to pass along line 50 from control valve 42 and to the arm 28 via line 47. The ram 28 is activated, lowering the additional wheel 11 and reducing the loading on the drive axle. The wheel is forced against the ground surface at a constant pressure supplied by pump 41.

The pressure at which the servo valve 46 operates can be pre-set within wide limits so that the supplementary wheels are lowered at any desired axle loading or overturning moment. In addition, should the operator elect to control the movement of the additional wheels independently of the automatic system, he can override the servo valve 46 by a conventional manual override control. This manual control allows the system to be overridden by the driver, enabling him to lower the supplementary wheels into contact with the ground when the vehicle is unladen. This might be necessary when working on soft ground or on very light decks. Where more than one additional wheel is provided, the hydraulic controls for raising and lowering these wheels may if desired by operated independently or together.

In known constructions of lifting vehicles provided with supplementary wheels, when the wheels are lowered they are maintained permanently in contact with the ground under high pressure from the lifting circuit. As a result, if in proportion to the load suspended the loaded vehicle drives over rough ground or over an obstruction such as a curb or a rail, a substantial proportion of the load can pass onto one of the supplementary wheels, causing severe damage to the wheel and its supporting mechanism. In order to prevent this, line 47 feeding the cylinder 28 is provided with the accumulator or pressure relief valve 48. This valve is set to operate at a predetermined pressure such that when the loading on the additional wheel exceeds a given maximum the relief valve is overcome and the piston rod 29 is allowed to retract into the cylinder 28 until the load on the wheel falls below the maximum value. Where an accumulator is provded, this is charged when the additional wheel runs over the obstruction, and when the obstacle is passed the ram returns to its normal position and pressure, thus maintaining a constant load on the wheel. The purpose of the one-way valve 45 is to allow pressure sensing in one direction only.

When the pressure in the pilot line 44 or electrical sensor signal falls below the predetermined level, (e.g. by the vehicle setting down its load), the servo valve 46 operates to release pressure in line 47 and place line 52 from the control valve 42 in communication with line 53 delivering to the return side of the ram 28. The piston rod 29 is raised to lift wheel 11 clear of the ground surface into its inoperative or non load bearing position. This prevents scuffing of these wheels during movement of the vehicle at axle loadings below the pre-set level and reduce tire wear.

While two additional wheel assemblies are described in connection with the preferred embodiments one for each side of the vehicle, it will be understood that more than two wheels may be used, or even a single wheel may be fitted on the centre-line of the vehicle.

By means of this invention the additional wheel can be moved within the transverse outside spacing of the front road wheels which means the usefulness of a truck is not impaired, the additional wheel does not hinder access to the vehicle road wheels and the automatic movement of the additional wheel into and out of the operative position is responsive to the over turning moment about the vehicle front road wheels.

I claim:

1. A load-carrying vehicle for raising and lowering loads, with an overturning moment about the axis of the vehicle front road wheels caused by supporting of a load, said load-carrying vehicle comprising a chassis mounted on conventional road wheels,
load carrying means including
load raising and lowering means supported by said chassis,
at least one additional road wheel,
parallel-like linkage means interconnecting said at least one additional road wheel and said chassis to articulate said at least one additional road wheel for movement with respect to said chassis, wherein in an inoperative position said at least one additional road wheel is supported by said parallel-like linking means above the front load wheels within the transverse outside spacing of the front road wheels, and in an operative load-bearing position said at least one additional road wheel is disposed in engagement with the ground beside the front road wheels of the vehicle, and
power operated means connected between said chassis and said parallel-like linkage means and operable in response to an overturning moment about the vehicle front road wheels when a load is supported by said load carrying means to move said at least one additional road wheel between said inoperative and operative positions.

2. A load-carrying vehicle in accordance with claim 7, further characterized by
said load raising and lowering means including
a load carrying arm supporting a load by one end portion and articulated at its other end portion to said chassis,
at least one hydraulic ram connected between said chassis and said load carrying arm to raise and lower said arm,
said power operated means to move said at least one additional road wheel including
another hydraulic ram in the hydraulic circuit of the aforementioned said at least one hydraulic ram to move said at least one additional road wheel into engagement with the ground when the overturning moment about the axis of the vehicle front road wheels exceeds a predetermined value.

3. A load-carrying vehicle in accordance with claim 1, further characterized by
said load raising and lowering means including
forks for supporting a load,
a mast tiltable fore and aft about its lower end with respect to said chassis and holding said forks,
at least one hydraulic ram connected between said chassis and said mast to tilt said mast fore and aft,
said power operated means to move said at least one additional road wheel including
another hydraulic ram in the hydraulic circuit of the aforementioned said at least one hydraulic ram to move said at least one additional road wheel into engagement with the ground when the overturning moment about the axis of the vehicle front road wheels exceeds a predetermined value.

4. A load-carrying vehicle in accordance with claim 1, further characterized by
a manual control means operable by the vehicle operator and connected with said power operated means to override the actuation of said power operated means in its response to the overturning moment about the axis of the vehicle front road wheels.

* * * * *